Figure 1:
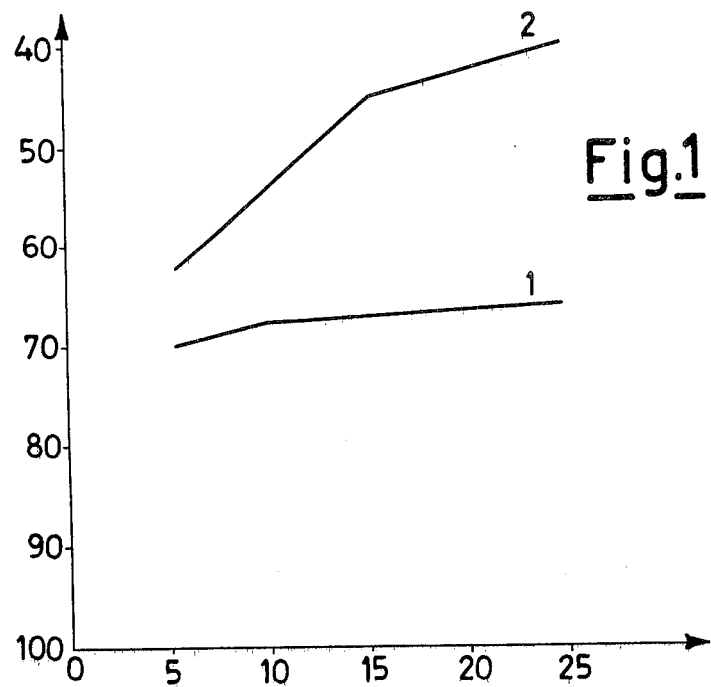

United States Patent [19]

Marconi et al.

[11] 4,087,356
[45] May 2, 1978

[54] METHOD FOR DEPOLLUTING FRESH AND SEA WATER FROM PETROLEUM PRODUCTS

[75] Inventors: Walter Marconi, Via Caviaga 1, S. Donato Milanese, Milan; Roberto Olivieri, Via A. Moscatelli, 109 - Mentana, Rome; Ludwig Degen, Via Ubaldo Peruzzi, 62 - Rome; Andrea Robertiello, Via delle Egadi, 36 - Rome, all of Italy

[73] Assignee: Snamprogretti S.p.A., Milan, Italy

[21] Appl. No.: 738,697

[22] Filed: Nov. 4, 1976

[30] Foreign Application Priority Data

Dec. 3, 1975  Italy .................................. 29959/75

[51] Int. Cl.² ............................................... C02B 9/02
[52] U.S. Cl. ..................... 210/11; 195/3 H; 210/36; 210/40; 210/DIG. 27
[58] Field of Search .................. 71/28, 29, 30, 64 F, 71/27, 64 G; 195/3 H, 96, 100; 210/2, 11, 36, 40, DIG. 26, DIG. 27, 59; 252/351, 357, DIG. 1

[56] References Cited

U.S. PATENT DOCUMENTS

| 3,539,519 | 11/1970 | Weimer | 252/DIG. 1 |
| 3,728,279 | 4/1973 | Salomone | 210/11 |
| 3,843,517 | 10/1974 | McKinney et al. | 195/3 H |
| 3,959,127 | 5/1976 | Bartha et al. | 210/11 |

FOREIGN PATENT DOCUMENTS 45-17123  6/1970  Japan ......................................... 71/28

Primary Examiner—Charles N. Hart
Assistant Examiner—Ivars Cintins
Attorney, Agent, or Firm—Morgan, Finnegan, Pine, Foley & Lee

[57] ABSTRACT

A method is disclosed, for depolluting fresh and sea waters from hydrocarbonaceous pollutants, the improvement consisting in that the usual microorganism cultures used for oxidizing the hydrocarbons are integrated by lipophilic and floating compounds which contain slow-release nitrogen in a form which can be assimilated by such micro-organisms. Ureidic derivatives of higher aldehydes are the preferred compounds. Inert supports can be used, if necessary, and still better results are achieved when using also nonionic dispersants and freeze-dried hydrocarbon-oxidizing microorganisms.

3 Claims, 5 Drawing Figures

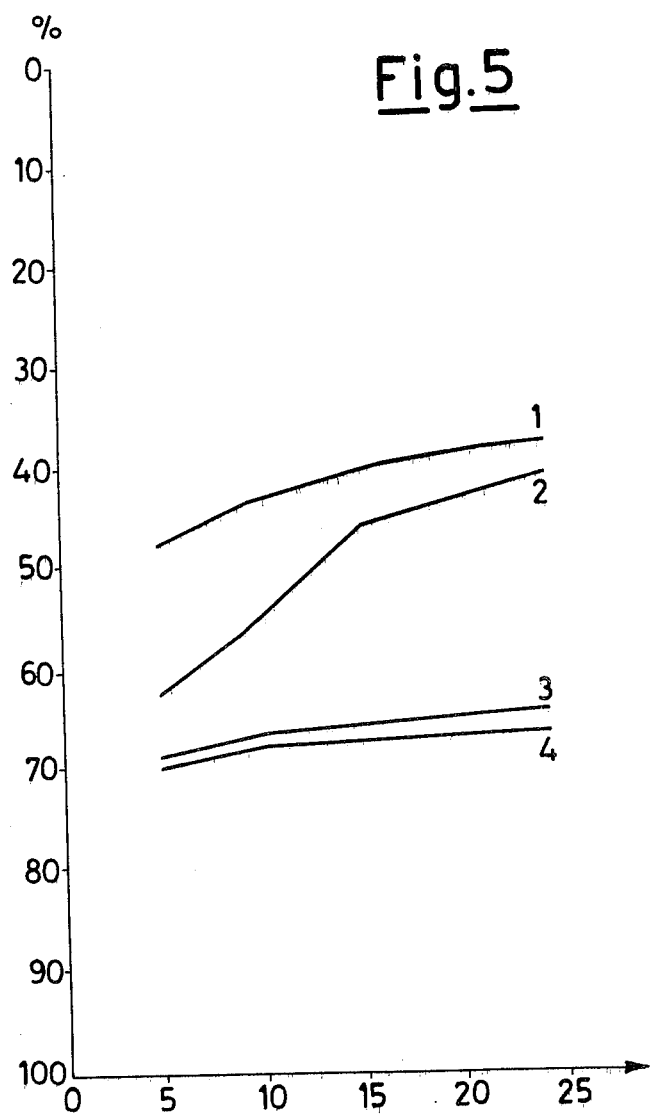

METHOD FOR DEPOLLUTING FRESH AND SEA WATER FROM PETROLEUM PRODUCTS

This invention relates to a method for depolluting fresh and sea water from petroleum products.

More particularly, the present invention relates to a method for removing pollutants from coasts, fresh and sea waters, as caused by crude petroleum products, and more generally by hydrocarbons, by employing a microbiological approach. An additional object of the present invention is to prepare means adapted to encourage the growth of naturally occurring, and/or added, microorganisms which are capable of oxidizing hydrocarbons and, more particularly, petroleum crude products. In U.S. application Ser. No. 460,224 filed Apr. 11, 1974, now abandoned, and continuation U.S. application Ser. No. 630,670 filed Nov. 10, 1975, both in the name of the same Applicants hereof, the preparation and the use had been claimed of compositions based on salts which are poorly soluble in water and which have been made lipophilic and floating by a paraffination method, said salts containing nitrogen and phosphorus in a form which can be assimilated by micro-organisms of the aquatic kind which are capable of metabolizing hydrocarbons. A method has now been found, and this is a primary object of the present invention, which consists in integrating the compositions based on salts which are poorly soluble in water and more particularly the paraffinized magnesium and ammonium phosphate, with compounds which are lipophilic and capable of floating as themselves, or which have been so made capable in paraffination, and which contain a slow-release nitrogen which can be assimilated by microorganisms. By so doing, more favorable (P + N)-to-oil ratios which are more favorable to biological degradation can be obtained, considerable savings of magnesium and ammonium being thus achieved. The compounds which are the most suited to this purpose belong to the chemical class of the ureidic derivatives of aldehydes, which are easy to be prepared and, moreover, are floating and lipophilic as themselves whenever the aldehydes concerned contain a number of carbon atoms equal to, or greater than, four.

Another outstanding aspect of the method according to the present invention is the fact that the use of materials having a low specific gravity in slow-release-nutrient- containing formulations, is such as to make possible a considerable reduction of the quantity of paraffins.

Paraffins act in such a case as glueing materials and lipophilic agents, the floatability being provided by the low-specific-gravity materials. As low-specific-gravity materials can be used: cork granulates or cork dust, sawdust, maize cob dust (common scraps), or expanded silicates such as pumice, expanded riolite, vermiculite and so forth. In addition, in the case of use of ureidic derivatives of higher aldehydes, such derivatives replace the paraffins and also the low-specific-gravity materials, inasmuch as, due to their physical properties, they permit to coat the poorly soluble phosphates, such as for example magnesium and ammonium phosphate, calcium phoshate and the like, a floating and lipophilic granulate being thus obtained.

The substances which can be employed in the method according to the present invention can be stored for indefinitely long times, do not belong to the category of the toxic products, can easily be shipped to the place of their use and it is easy to spread them over the polluted surfaces and permit that pollutions due to hydrocarbons and crude petroleum may be destroyed within a short period of time.

An important advantage of such method resides in the fact that the used nutrients accelerate a natural biological degradation process of the pollutants without disturbing the ecological equilibrium. On completion of the use no more residues are left and, in the case of porous bodies, the residues are nothing but minerals which already exist in the natural environment.

A further improvement in the present method of biological degradation is achieved by using nonionic dispersants. These latter display an action which is synergistic towards the action of the nutrients, inasmuch as they enhance an improved distribution of the nutrients, as contained in the above referred to formulations, in the oily phase. It has been observed, moreover, that, in a few cases, improved biological degradation results can be obtained when adding to the above referred to formulations freeze-dried hydrocarbon-oxidizing microorganisms.

What has been explained hereinbefore, as well as further operational indications, will be better understood from the ensuing Examples, which are reported herein with a view of illustrating the invention in a clearer way but without limiting, in the slightest, the scope thereof. FIGS. 1–5 show results of the following examples.

EXAMPLE 1

To 500-ml flasks having a ground-glass neck and containing 200 mls of sea water (taken in the neighborhood of the Ostia coast, Rome) which had not been sterilized, along with 100 milligrams of "BASRA" crude, were added 5 milligrams of a granulate of magnesium and ammonium phosphate ($MgNH_4PO_4.6H_2O$) which had been paraffined (according to the method as described in the above mentioned Patent Application), along with 12 milligrams of 1-ureido-1-hydroxy-3-methyl-butane.

The flasks were incubated at 25° C with rotary stirring (100 rpm with an eccentricity of 5 centimeters). At the starting instant, 0, and every sixth day, the residue of crude petroleum was determined by extraction with $CCl_4$ according to the following procedure: the flasks were charged with 2.5 mls of 0.5 N HCl, 50 mls $CCl_4$ and from 4 to 5 grams of glass spherules having a diameter of about 0.5 millimeters. The hermetically sealed flasks were shaken on a shaker (about 500 rpm) during 15 mins. A portion of the organic phase, which had been filtered over anhydrous sodium sulphate, was analyzed according to the method disclosed by the "Revue de l'Institut Francais du Petrole", 9, 419 (1966).

A few of the flasks, which contained only sea water and crude petroleum, without nutritional salts, were used as the control standards.

The results which have been obtained, are illustrated in the plot FIG. 1, in which the ordinates report the residual crude petroleum, expressed in percent, and the abscissae the time, in days. The curve 1 is the control and the curve 2 shows the same material but treated according to this invention.

EXAMPLE 2

12.2 grams of magnesium and ammonium phosphate ($MgNH_4PO_4.6H_2O$), 11.6 grams of crotonylidene-diurea and 50 grams of expanded riolite were slurried in 500 mls of a solution of 20 grams of paraffin wax having a melting range from 58° to 60° C in nor. pentane.

The solvent was then removed under vacuum in a Rotavaport.

Two sets of flasks were prepared with 500-ml flasks containing, as in EXAMPLE 1, 200 mls of sea water and 100 milligrams of "BASRA" crude. To the first flask set were added: 18 milligrams of a granulate as obtained in the manner described hereinbefore. The second flask set was the control standard (sea water and crude). The flasks were incubated and the oily phase extracted as described in EXAMPLE 1 above.

Figure 2:
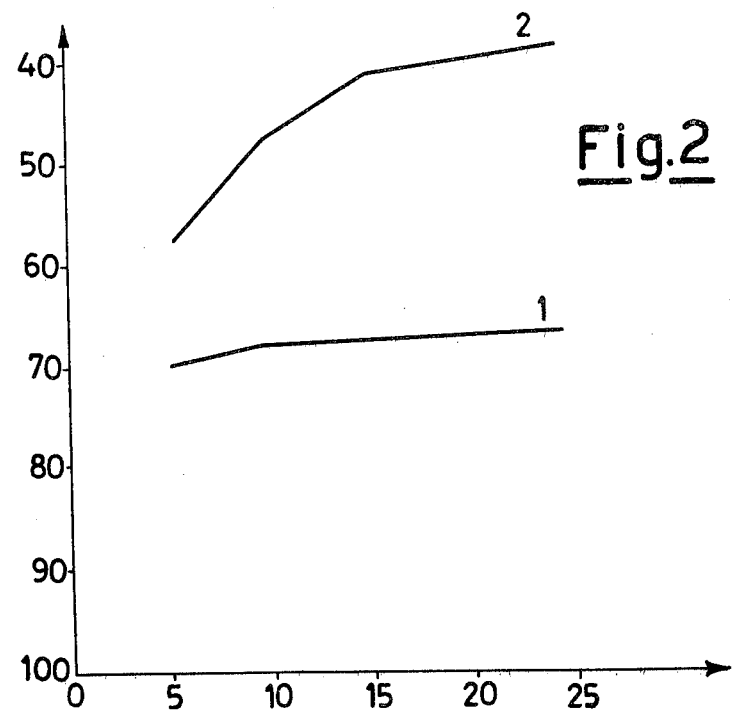

The results are plotted in FIG. 2, wherein the ordinates report the residual crude in percentage and the abscissae the time in days.

The curve 1 refers to the control standard and the curve standard and the curve 2 is referred to the same material as treated according to the present Example 2.

EXAMPLE 3

40 grams of magnesium and ammonium phosphate (MgNH$_4$PO$_4$.6H$_2$O) and 20 grams of cork dust were slurried in 2 liters of a solution containing 2 grams of paraffin waxes (melting range 58°–60° C) in nor.pentane. The solvent was subsequently evaporated off as disclosed in EXAMPLE 2 above.

To three sets of 500-ml flasks containing, as in EXAMPLE 1, 200 mls of sea water and 100 milligrams of "BASRA" crude were added: 1) 62 milligrams of a granulate as prepared in the manner described hereinabove and 5 milligrams of emulsifier (2,2'-hydroxydiethylolamide); (2) as in (1) above but without emulsifiers; (3) conrol standard (sea water and crude).

The flasks were incubated and the oily phase extracted as described in EXAMPLE 1.

Figure 3:
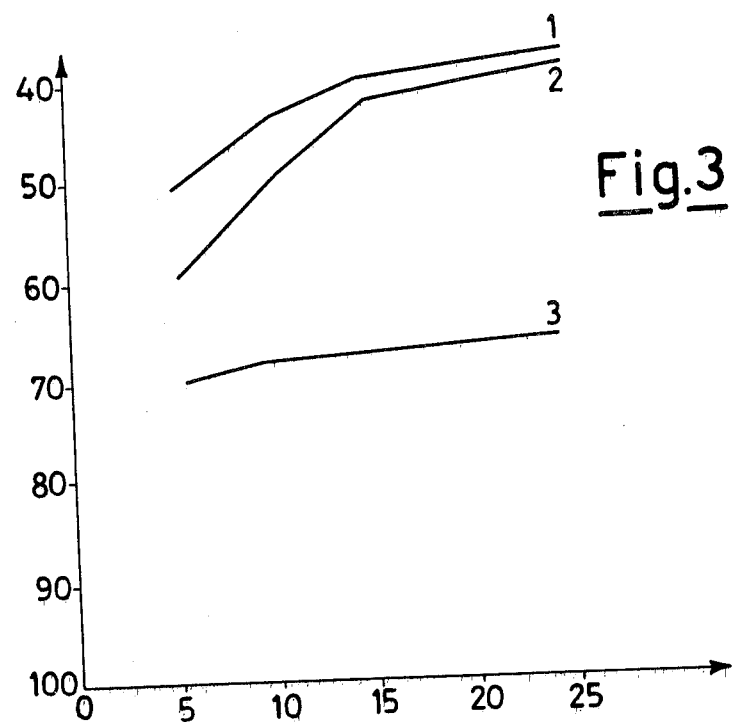
Figure 4:
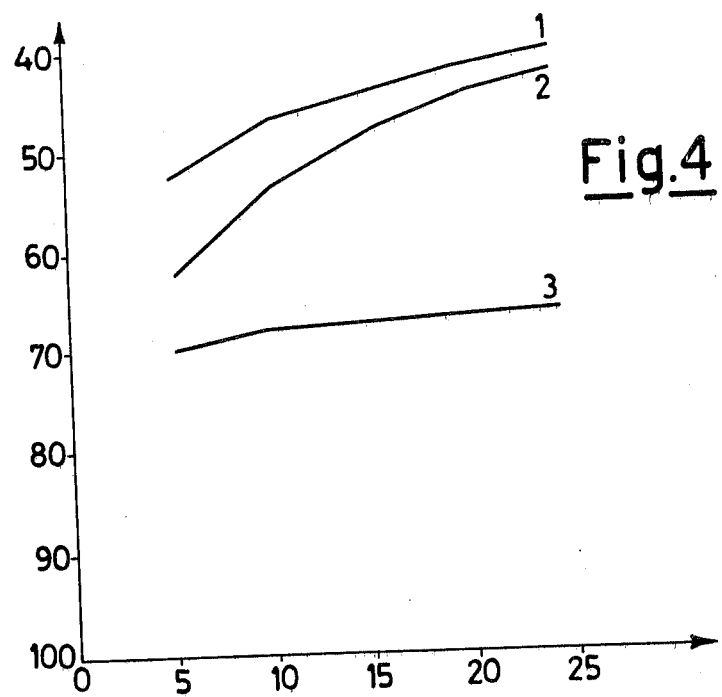

The results are plotted in FIG. 3 wherein the ordinates report the residual crude in percentage and the abscissae the time in days.

The curves 1, 2 and 3, are referred to the treatments under (1), (2), and (3) hereinabove, respectively.

EXAMPLE 4

40 grams of magnesium and ammonium phosphate and 120 grams of 1-ureido-1-hydroxy-3-phenylpropane were slurried in 500 mls of a solution of 20 grams of paraffin wax in nor. pentane. The solvent was driven off as described in EXAMPLE 2.

According to the procedure of EXAMPLE 3 there were prepared three sets of flasks with sea water and crude. To the first set were added 18 milligrams of the granulate as obtained in the manner described in the foregoing, together with a mixture of alkyloxypoly(ethylenoxy)ethanols. To the second set were added 18 milligrams of granulate. The third set was used as the control standard (without any addition).

To flasks were incubated and extractions carried out as described above and the results are plotted in FIG. 4.

The curves 1, 2 and 3 refer to the 1st, 2nd and 3rd sets of treatments as described hereinabove, respectively.

EXAMPLE 5

With the procedure of EXAMPLE 1, four sets of flasks have been prepared, which contained sea water and crude. To the first and the second set were added 5 milligrams of a paraffined granulate of magnesium and ammonium phosphate and 12 milligrams of 1-ureido-1-hydroxy-3-methyl-butane. The flasks of the first set, in addition, were inoculated with 1 milligram of hydrocarbon-oxidizing, freeze-dried bacteria. The third set of flasks without nutrients was inoculated with 1 milligram of freeze-dried bacteria, and the fourth set was left untreated to serve as a control. The results which have been obtained are plotted in FIG. 5. The curves 1,2,3 and 4 refer to the 1st, 2nd, 3rd and 4th sets of treatments as indicated above, respectively.

What we claim is:

1. A method of removing hydrocarbonaceous pollutants from the surface of water which is polluted thereby and which contains aqueous microorganisms capable of metabolizing said hydrocarbonaceous pollutants, which comprises dispersing over said polluted surface particles comprised of:
   (a) paraffinized magnesium ammonium phosphate;
   (b) a ureidic derivative selected from 1-ureido-1-hydroxy-3-methyl-butane, crotonylidene-diurea, and 1-ureido-1-hydroxy-3-phenylpropane; and
   (c) 2,2'-hydroxydiethylolamide.

2. The method of removing hydrocarbonaceous pollutants from the surface of water which is polluted thereby and which contains aqueous microorganisms capable of metabolizing said hydrocarbonaceous pollutants, which comprises dispersing over said polluted surface particles comprised of:
   (a) paraffinized magnesium ammonium phosphate;
   (b) a ureidic derivative selected from 1-ureido-1-hydroxy-3-methyl-butane, crotonylidene-diurea, and 1-ureido-1-hydroxy-3-phenylpropane;
   (c) 2,2'-hydroxydiethylolamide; and
   (d) freeze-dried hydrocarbon-oxidizing microorganisms.

3. The method of removing hydrocarbonaceous pollutants from the surface of water which is polluted thereby and which contains aqueous microorganisms capable of metabolizing said hydrocarbonaceous pollutants, which comprises dispersing over said polluted surface particles comprised of:
   (a) paraffinized magnesium and ammonium phosphate; and
   (b) 1-ureido-1-hydroxy-3-methyl-butane.

* * * * *